(12) United States Patent
Hengelmolen et al.

(10) Patent No.: US 7,121,733 B2
(45) Date of Patent: Oct. 17, 2006

(54) FERRULE

(76) Inventors: Arie Hengelmolen, Hofvijver 23, 5346 KB Oss (NL); Sjoerd van Geffen, Distellaar 52, 5467 BP Veghel (NL); Rene van Bakel, Oss (NL); Ko Arts, Houtstr 5, 5831 GG Boxmeer (NL); Wilfred Vermeulen, Torenstraat 24, 5473 EL, Heeswikj-Dinther (NL); Shurby Eloise, St. Jorisstraat 12, 5253 BL, Nieuw-Cuick (NL); Martijn Scholten, Elzepas 30, 6662 XC Elst (NL); Mike Gurreri, 2156 Rillian Lane, York, PA (US) 17404; Hiroyuki Yamada, 19 Yawatakaigandori, Ichihara, Chiba (JP); Masahiro Hirao, Chiba (JP)

( * ) Notice: Subject to any disclaimer, the term of this patent is extended or adjusted under 35 U.S.C. 154(b) by 551 days.

(21) Appl. No.: 10/055,611

(22) Filed: Oct. 29, 2001

(65) Prior Publication Data

US 2004/0161205 A1 Aug. 19, 2004

(Under 37 CFR 1.47)

Related U.S. Application Data

(63) Continuation-in-part of application No. 09/858,522, filed on May 16, 2001, now abandoned.

(30) Foreign Application Priority Data

May 16, 2000 (JP) ........................................ 2000-143084

(51) Int. Cl.
    G02B 6/36    (2006.01)

(52) U.S. Cl. ....................................................... 385/78
(58) Field of Classification Search ............. 385/59–61, 385/65, 76–80, 83
    See application file for complete search history.

(56) References Cited

U.S. PATENT DOCUMENTS

| | | | | | |
|---|---|---|---|---|---|
| 5,862,280 | A | * | 1/1999 | Tanaka et al. | 385/78 |
| 6,155,722 | A |   | 12/2000 | Nonomura et al. | 385/84 |
| 6,305,850 | B1 | * | 10/2001 | Luther et al. | 385/78 |
| 6,350,062 | B1 | * | 2/2002 | Knecht et al. | 385/84 |
| 6,623,175 | B1 | * | 9/2003 | Suematsu et al. | 385/78 |
| 2002/0186932 | A1 | * | 12/2002 | Barnes et al. | 385/78 |
| 2002/0186934 | A1 | * | 12/2002 | Hug et al. | 385/80 |

FOREIGN PATENT DOCUMENTS

| | | |
|---|---|---|
| CH | 687105 | 9/1996 |
| DE | 25 16 662 | 7/1976 |
| EP | 1 061 390 A1 | 12/2000 |
| JP | 60-186812 * | 9/1985 |
| JP | 01017010 | 1/1989 |
| JP | 09203825 | 8/1997 |

* cited by examiner

Primary Examiner—Chau N. Nguyen

(57) ABSTRACT

There is provided a ferrule which has a fiber fixed hole into which an optical fiber can be inserted easily without being broken and which can provide a sufficient fiber bonding strength, and which can restrain variations in connection loss caused by the temperature variations.

A ferrule 10 is provided with two alignment pin holes 10a into which alignment pins for positioning with respect to a mating ferrule are inserted, and a plurality of fiber fixed holes H formed at predetermined intervals between the alignment pin holes to insert optical fibers. Each of the fiber fixed holes H has at least a fiber guide hole 10d for guiding the optical fiber, a fiber hole 10c connected with the fiber guide hole to accommodate the tip end of the optical fiber, and a fiber insertion hole 10e connected with the fiber guide hole 10d to introduce the optical fiber into the ferrule. A connecting portion of the fiber guide hole 10d and the fiber insertion hole 10e is formed into a taper shape. And the fiber insertion hole 10e is formed so as to introduce the sheathed portion of individual optical fiber.

4 Claims, 4 Drawing Sheets

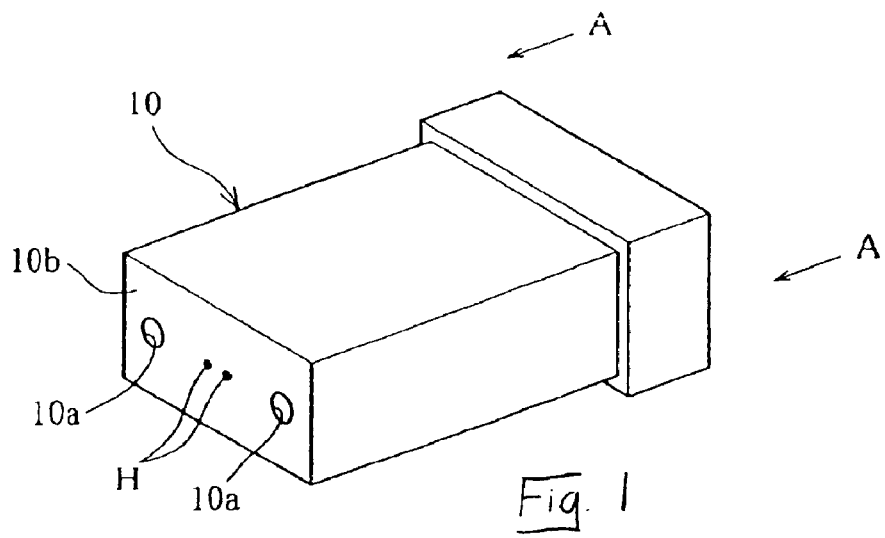
Fig. 1
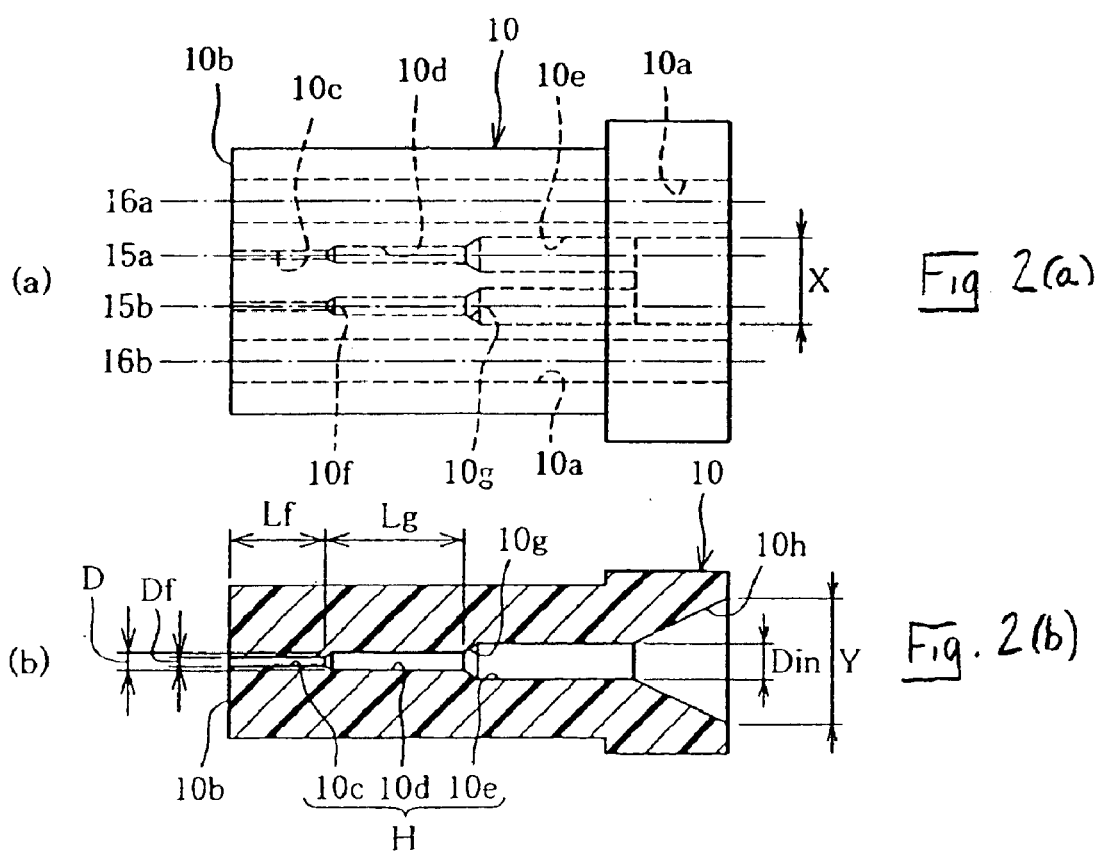
Fig. 2(a)
Fig. 2(b)

FERRULE

This application is a continuation-in-part of U.S. application Ser. No. 09/858,522 filed May 16, 2001 now abandoned

DETAILED DESCRIPTION OF THE INVENTION

Industrial Field of Application

The present invention relates to a ferrule for a multi-connector used for a connecting portion of optical fibers in optical communications and a connecting portion of optical modules such as optical semiconductors and, more particularly, to a ferrule for an MT connector.

BACKGROUND

A ferrule for a multi-connector, which is installed at the end of a plurality of optical fibers and is used for connection between the optical fibers, is molded using a thermosetting resin or a thermoplastic resin.

For example, a ferrule 1 shown in FIG. 8 is provided with two alignment pin holes 1a in which alignment pins for positioning with respect to another ferrule of the same construction are inserted, and two fiber holes 1c which are formed at a predetermined interval between the alignment pin holes 1a and are open to a ferrule end face 1b so that optical fibers are inserted therein. As shown in FIG. 9, the ferrule 1 is also provided with a boot insertion hole 1d which is open to a rear end face, and an adhesive agent inserting window 1e which is formed at a substantially central portion perpendicularly to the boot insertion hole id and is open to a top face of the ferrule 1. In this construction, the ferrule 1 is formed with a fiber guide hole 1f located between the fiber hole 1c and the adhesive agent inserting window 1e, and a U-shaped groove 1g located adjacent to the fiber guide hole 1f.

Therefore, the ferrule 1 is assembled into a multi-connector in the following way: An optical fiber, for example, an optical ribbon fiber with fibers separated is inserted through the boot insertion hole 1d, and the optical fibers are inserted into the fiber holes 1c through the U-shaped grooves 1g and the fiber guide holes 1f. Then, an adhesive agent is poured through the adhesive agent inserting window 1e to fix the optical fibers. The extending portion of the optical ribbon fiber is protected by a boot inserted into the rear part of the ferrule 1.

PROBLEMS THAT THE INVENTION IS TO SOLVE

The conventional ferrule shown in FIGS. 8 and 9 is provided with step portions S1 and S2 at the substantially central portions of the boot insertion hole 1d. For this reason, the ferrule 1 has a problem in that when an optical fibers are inserted into the fiber holes 1c through the boot insertion hole 1d, the U-shaped grooves 1g, and the fiber guide holes 1f to assemble an optical connector, the optical fiber is liable to abut on the step portions S1 and S2, so that the work efficiency is low, and in the worst case, the optical fiber is broken.

Another problem is that since the boot insertion hole 1d and the adhesive agent inserting window 1e occupy a large volume in the ferrule 1, the quantity of adhesive agent put in the ferrule 1 increases, resulting in variations in connection loss when the temperature varies.

The present invention has been made to solve the above problems, and accordingly an object thereof is to provide a ferrule which has a fiber fixed hole into which an optical fiber can be inserted easily without being broken and which can provide a sufficient fiber bonding strength, and which can restrain variations in connection loss caused by the temperature variations.

SUMMARY OF THE INVENTION

To achieve the above object, the ferrule defined in claim 1 of the present invention is provided with two alignment pin holes into which alignment pins for positioning with respect to a mating ferrule are inserted, and a plurality of fiber fixed holes, which have an axis line in a plane including the axis lines of the two alignment pin holes and are formed at predetermined intervals between the two alignment pin holes, for inserting an optical fiber, and is characterized in that each of the fiber fixed holes has at least a fiber guide hole for guiding the optical fiber, a fiber hole connected with the fiber guide hole to accommodate the tip end of the optical fiber, and a fiber insertion hole connected with the fiber guide hole to introduce the optical fiber into the ferrule, and a connecting portion of the fiber guide hole and the fiber insertion hole is formed into a taper shape.

Since the tip end of the optical fiber is inserted from the fiber insertion hole into the fiber guide hole along the tapered portion without being resisted, the efficiency of work for inserting the fiber is increased, and also the breakage of the optical fiber is prevented.

Also, variations in connection loss caused by the temperature variations in the application environment of the ferrule are prevented.

Also, according to the ferrule defined in claim 1 of the present invention, in said fiber insertion hole is formed so as to introduce the sheathed portion of individual optical fiber.

Therefore, each fiber can be inserted surely into a predetermined fiber insertion hole. Also, since the fiber insertion hole is formed separately, the aligning operation at the time of fiber insertion is excellent. If the fiber insertion hole is formed so as to have a substantially circular shape on the end face, more excellent aligning operation can be provided.

Also, according to the ferrule defined in claim 2 of the present invention, in the ferrule according to claim 1, the fiber insertion hole is formed as a common fiber insertion hole for introducing a plurality of sheathed portions, and the fiber insertion hole is provided with movement regulating means for regulating the movement of sheathed portion in the direction of arrangement of sheathed portion.

Since the movement regulating means is formed in the fiber insertion hole, the optical fiber can be inserted surely into a predetermined fiber insertion hole.

Further, according to the ferrule defined in claim 3 of the present invention, in the ferrule according to claim 2, the movement regulating means consists of a convex portion, and the width of the fiber insertion hole in the movement regulating means in the direction perpendicular to the direction of arrangement of sheathed portion is smaller than the diameter of the sheathed portion.

Therefore, the sheathed portion inserted in the fiber insertion hole is surely prevented from moving unnecessarily in the direction of arrangement of sheathed portion.

Also, according to the ferrule defined in claim 4 of the present invention, in the ferrule according to claim 1, an adhesive agent pool for fixing the optical fiber is formed at the opening portion of the fiber insertion hole.

Since the adhesive agent pool is formed, an adhesive agent can easily be poured. Also, even if the adhesive agent flows reversely in the fiber fixed hole at the time of optical fiber insertion, the adhesive agent does not flow out of the ferrule along the optical fiber.

Also, according to the ferrule defined in claim 5 of the present invention, in the ferrule according to claim 5, the width of the opening portion of the adhesive agent pool in the direction perpendicular to the direction of arrangement of sheathed portion is larger than the width of the opening portion in the direction of arrangement of sheathed portion.

Therefore, an adhesive agent pool as large as possible can be formed between the alignment pin holes at a limited interval while the thickness between the alignment pin hole and the adhesive agent pool is maintained sufficiently in terms of strength.

Also, according to the ferrule defined in claim 6 of the present invention, in the ferrule according to claim 1, the fiber guide hole and the fiber insertion hole are formed into a continuous taper shape.

Since the fiber guide hole and the fiber insertion hole are formed into a continuous taper shape, the tip end of the optical fiber can be inserted from the fiber insertion hole into the fiber guide hole along the tapered portion without being resisted. Therefore, the efficiency of work for inserting the fiber is increased, and also the breakage of the optical fiber is prevented.

Also, variations in connection loss caused by the temperature variations in the application environment of the ferrule are prevented.

DESCRIPTION OF THE DRAWINGS

FIG. 1 shows a perspective view of a ferrule according to one embodiment of the present invention.

FIG. 2(*a*) shows a plan view of the ferrule of FIG. 1.

FIG. 2(*b*) shows a longitudinal view of the ferrule of FIG. 1.

FIG. 6(*b*) show a longitudinal section view of the ferrule of FIG. 6(*a*).

DESCRIPTION OF PREFERRED EMBODIMENTS

Embodiments of a ferrule in accordance with the present invention will now be described with reference to FIGS. 1 to 7.

A ferrule 10 in accordance with a first embodiment, which is molded using a thermosetting resin such as epoxy resin or a thermoplastic resin such as liquid crystal polymer and polyphenylene sulfide (PPS), is, as shown in FIGS. 1 and 2, provided with two alignment pin holes 10*a* into which alignment pins for positioning with respect to another ferrule of the same construction are inserted, and fiber fixed holes H which are formed at a predetermined interval between the two alignment pin holes 10*a*. One end of the fiber fixed hole H is open to a ferrule end face 10*b*, and the other end thereof is open to a bottom portion of an adhesive agent pool 10*h* formed on the rear end face, so that an optical fiber is fixed to the ferrule 10 with an adhesive agent after the optical fiber is inserted. The fiber fixed holes H are arranged so that the center axis lines 15*a* and 15*b* of the fiber fixed holes H and the center axis lines 16*a* and 16*b* of the alignment pin holes 10*a* form a same plane (see FIG. 3).

The ferrule in accordance with the present invention is molded using the aforesaid synthetic resin in other embodiments described later as well.

The fiber fixed hole H has a fiber hole 10*c*, a fiber guide hole 10*d*, and a fiber insertion hole 10*e*, these holes having the same hole center, and tapered portions 10*f* and 10*g* are provided between the fiber hole 10*c* and the fiber guide hole 10*d* and between the fiber guide hole 10*d* and the fiber insertion hole 10*e*, respectively.

Figure 3:
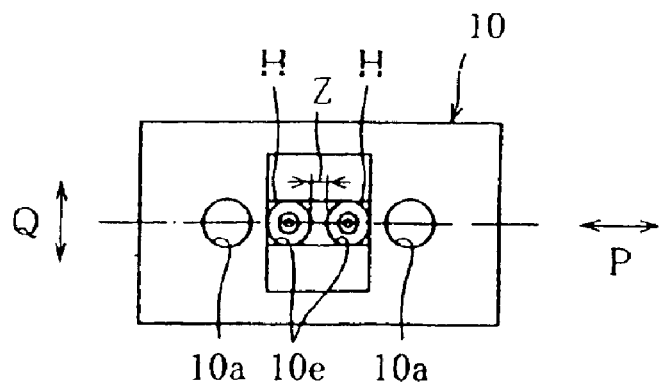
FIG. 3 shows a view taken along the direction of arrows "A" in FIG. 1.

The fiber fixed holes H are formed at a predetermined interval. Specifically, as shown in FIG. 3, a wall with a thickness Z is formed between the fiber insertion holes 10*e* of the fiber fixed holes H. Thereby, east optical fiber can be inserted surely into a predetermined fiber insertion hole. Also, since the fiber insertion holes having a substantially circular shape on the end face are formed separately, the aligning operation at the time of optical fiber insertion is especially excellent.

The fiber hole 10*c* is formed so as to have a diameter slightly larger than that of the fiber 5*a*, which is provided by raring a sheathed portion 5*b* from an inserted optical ribbon fiber 5 (see FIG. 4), and is open to a ferrule end face 10*b*. The fiber guide hole 10*d*, which has a diameter larger than that of the fiber hole 10*c*, guides, into the fiber hole 10*c*, the optical fiber inserted into the fiber insertion hole 10*e* from the rear part of the ferrule 1. The fiber insertion hole 10*e*, which has a diameter larger than that of the fiber guide hole 10*d*, guides the optical ribbon fiber into the ferrule 10. The tapered portion 10*f*, 10*g* guides the optical fiber inserted into the fiber insertion hole 10*e* into the fiber guide hole 10*d* and the fiber hole 10*c* smoothly without the optical fiber abutting on the boundary of the connected hole.

The opening of the adhesive agent pool 10*h* is formed so that the width (X in FIG. 2(*a*)) in the direction of arrangement of the fiber insertion holes 10*e*, that is, in the direction of arrangement of the sheathed portion of the inserted optical ribbon fiber (the direction of P in FIG. 3) is smaller than the width (Y in FIG. 2(*a*)) in the direction perpendicular to the direction of arrangement of the sheathed portion (the direction of Q in FIG. 3). The adhesive agent pool 10*h* allows an adhesive agent to be easily poured in each fiber fixed hole H, and also prevents the adhesive agent from flowing out of the ferrule 10 along the optical fiber after the optical fiber is inserted.

The fiber guide hole 10*d* of the ferrule 10 preferably has a greater length. This is because the presence of adhesive agent in some degree of quantity between the inside face of hole and the inserted fiber 5*a* (see FIG. 4) contributes to an increase in strength against a pulling-out force. However, the adhesive agent used for the ferrule 10 has a coefficient of linear expansion different from that of the synthetic resin composing the ferrule 10 in the heat cycle test specified in Section 8.2 of JIS C 5961 or in the wet heat test etc. specified in Section 8.4 of JIS C 5961. In addition, the adhesive agent has characteristics of high hygroscopic property, and easily involves air bubbles. For these reasons, the ferrule 10 easily produces variations in connection loss caused by the temperature variations in the application environment.

Therefore, in the ferrule in accordance with the present invention, the dimensional conditions of the fiber guide hole 10*d* should preferably be as described below in order that the condition of the strength against the pulling-out force of 19.6 N is satisfied and the variations in connection loss in the heat cycle test or the wet heat test are not larger than 0.2 dB.

Specifically, when a non-filler adhesive agent or an adhesive agent with an average filler particle diameter not larger than 10 μm and a maximum filler particle diameter not larger than 20 μm is used, taking the diameter of the fiber hole 10*c* as Df(mm), the diameter of the fiber insertion hole 10*e* as Din(mm), and the length of the fiber hole 10*c* as Lf(mm) as shown in FIG. 2(*b*), the diameter D(mm) and the length Lg(mm) of the fiber guide hole 10*d* should be set so that the relationship expressed by the following equations holds.

$$(Df+0.06)<D<(Din-0.2)$$

$$Lf \leq Lg \leq 2Lf$$

As an example, when a non-filler adhesive agent or an adhesive agent with an average filler particle diameter not larger than 10 μm and a maximum filler particle diameter not larger than 20 μm is used, it can be thought that the diameter of the fiber hole 10*c*, the diameter of the fiber insertion hole 10*e*, and the length of the fiber hole 10*c* are set so that Df=0.126 (mm), Din=0.65 (mm), and Lf=1.6 (mm), respectively, the diameter and the length of the fiber guide hole 10*d* are set so that D=0.25 (mm) and Lg=2 (mm), respectively, and the pitch P of the two fiber holes 10*c* is set so that P=0.75 (mm).

A gap between the inside face of the fiber guide hole 10*d* and the fiber 5*a* (see FIG. 4) is filled with the adhesive agent. When an adhesive agent containing fillers is used, this gap is preferably 0.01 mm or more larger than the maximum filler particle diameter.

The ferrule 10 constructed as described above is assembled into a multi-connector by inserting an optical fiber in a way as described below.

First, a proper quantity of a thermosetting adhesive agent is supplied from the adhesive agent pool 10*h* at the rear part of the ferrule 10, and is sucked from the fiber holes 10*c* that is open to the ferrule end face 10*b*. Thereby, the adhesive agent is packed in the whole of the fiber fixed holes H, that is, the fiber holes 10*c*, fiber guide holes 10*d*, and fiber insertion holes 10*e* of the ferrule 10.

Since the width Y of the adhesive agent pool in the direction perpendicular to the direction of arrangement of sheathed portion is larger than the width X thereof in the direction of arrangement of sheathed portion, the adhesive agent can be poured easily into the fiber fixed holes.

Figure 4:
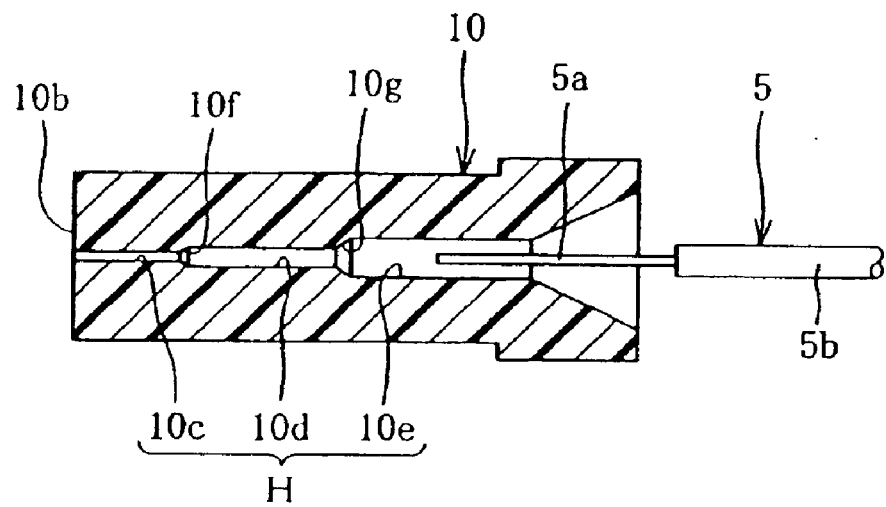
FIG. 4 shows a longitudinal sectional view of the ferrule of FIG. 1. having an optical fiber inserted therein.

Next, as shown in FIG. 4, the optical ribbon fiber 5, in which a sheathed portion 5*b* of a length corresponding to the length of the fiber hole 10*c* and fiber guide hole 10*d* is removed from the tip end side, and a fiber 5*a* is exposed, is inserted from the fiber insertion hole 10*e* at the rear part of the ferrule 10. Then, the adhesive agent is cured by heat in a state in which the tip end of the fiber 5*a* slightly projects from the ferrule end face 10*b*.

When the optical ribbon fiber 5 is inserted into the fiber fixed hole H, the end of the sheathed portion 5*b* comes into contact with the tapered portion 10*g* between the fiber guide hole 10*d* and the fiber insertion hole 10*e*, so that the optical ribbon fiber 5 stops temporarily. At this time, by reciprocating the optical ribbon fiber 5 slightly in the axial direction in the fiber fixed hole H several times, the quantity of the adhesive agent packed in the fiber guide hole 10*d* can be made constant. Also, by this operation, the adhesive agent can be intruded between the inside face of the fiber hole 10*c* and the fiber 5*a*.

Therefore, the ferrule 10 has the fiber fixed hole H into which the optical fiber can be inserted easily without breakage of the optical ribbon fiber 5 and which can provide a sufficient strength for bonding to the optical ribbon fiber 5, and can restrain variations in connection loss caused by the temperature variations.

Also, since the adhesive agent pool 10*h* is formed, even if a reverse flow of adhesive agent is produced in the fiber fixed hole by the insertion of optical fiber, the adhesive agent caused to flow out of the opening of the fiber insertion hole by this reverse flow stays in the adhesive agent pool 10*h*, and does not flow unnecessarily out of the ferrule 10.

Since the width Y of the adhesive agent pool 10*h* in the direction perpendicular to the direction of arrangement of sheathed portion is larger than the width X thereof in the direction of arrangement of sheathed portion as described above, a large adhesive agent pool can be formed between the alignment pin holes at a limited interval while the thickness between the alignment pin hole 10*a* and the adhesive agent pool 10*h* is maintained sufficiently in terms of strength, so that the above-described outflow from the ferrule 10 can be prevented surely.

When the ferrule 10 is assembled into a multi-connector by inserting the optical ribbon fiber 5 into the fiber fixed hole H, a part of the optical ribbon fiber 5 extending from the ferrule 10 is protected by a boot (not shown) inserted in the rear part of the ferrule 10.

Figure 5:
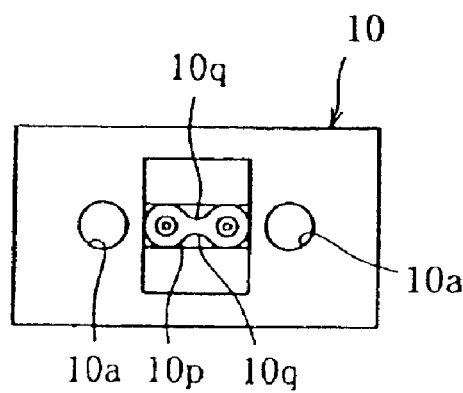
FIG. 5 shows a view corresponding to that of FIG. 3, for a modified ferrule of FIG. 1.

The fiber insertion hole need not necessarily be formed separately. As shown in FIG. 5, the fiber insertion hole may be formed as a common fiber insertion hole 10*p* that introduces a plurality of sheathed portions, and convex portions (movement regulating means) 10*q* may be provided in the fiber insertion hole 10*p* to regulate the movement of sheathed portion in the direction of arrangement of sheathed portion. Since the convex portions 10*q* are formed, the optical fiber can be inserted surely in the predetermined fiber insertion hole as in the case where the fiber insertion hole is formed separately.

Figure 6A:
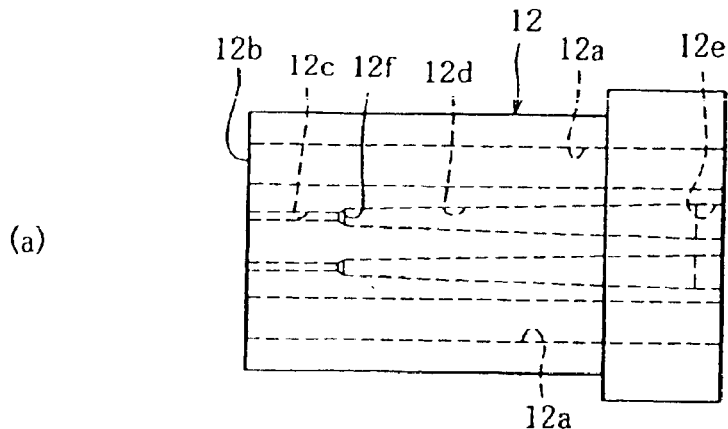
FIG. 6(*a*) shows a plan view of a ferrule according to another embodiment of the present invention.
Figure 6B:
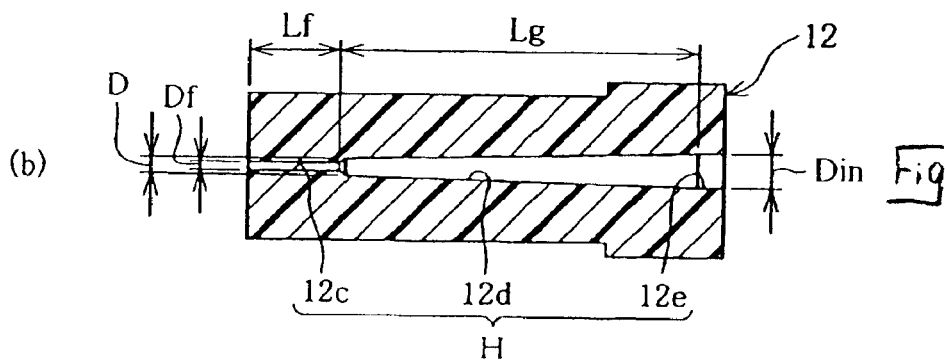

Next, a ferrule in accordance with a second embodiment of the present invention will be described with reference to FIGS. 6(*a*) and 6(*b*).

A ferrule 12 in accordance with the present invention is provided with two alignment pin holes 12*a* for inserting alignment pins, and two independent fiber fixed holes H which are formed at a predetermined interval between the two alignment pin holes 12*a*. One end of the fiber fixed hole H is open to a ferrule end face 12*b*, and the other end thereof is open to the rear end face of ferrule. An optical fiber is inserted into and fixed to the fiber fixed hole H with an adhesive agent.

Each of the fiber fixed holes H has a fiber hole 12*c*, a fiber guide hole 12*d*, and a fiber insertion hole 12*e*, these holes having the same hole center. The fiber guide hole 12*d* is formed so that the diameter thereof decreases gradually from the side of the fiber insertion hole 12*e* toward the fiber hole 12*c*, and a tapered portion 12*f* is provided between the fiber guide hole 12*d* and the fiber hole 12*c*. Specifically, the fiber guide hole 12*d* and the fiber insertion hole 12*e* are formed into a continuous taper shape.

Thus, the ferrule 12 is formed into a taper shape such that the diameter of the fiber guide hole 12*d* decreases gradually from the side of the fiber insertion hole 12e toward the fiber hole 12c. It is preferable that the ferrule 12 be formed so that each of the fiber fixed holes H satisfies the same relational equation as that of the fiber fixed hole H of the first embodiment. Thereby, when the ferrule 12 is assembled into a multi-connector by inserting the optical ribbon fiber into the fiber fixed holes H, in addition to the effects of the ferrule 10, the optical ribbon fiber can be inserted more easily as compared with the ferrule 10, and the assembling efficiency is further increased. At this time, the diameter of the fiber guide hole 12d is an average diameter of (Df+Din)/2 (mm).

Figure 7:
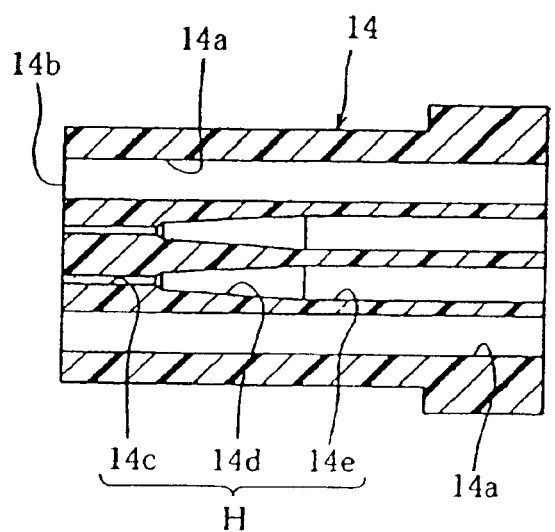
FIG. 7 shows a sectional plan view of a modified ferrule of FIG. 6(*a*).
Figure 8:
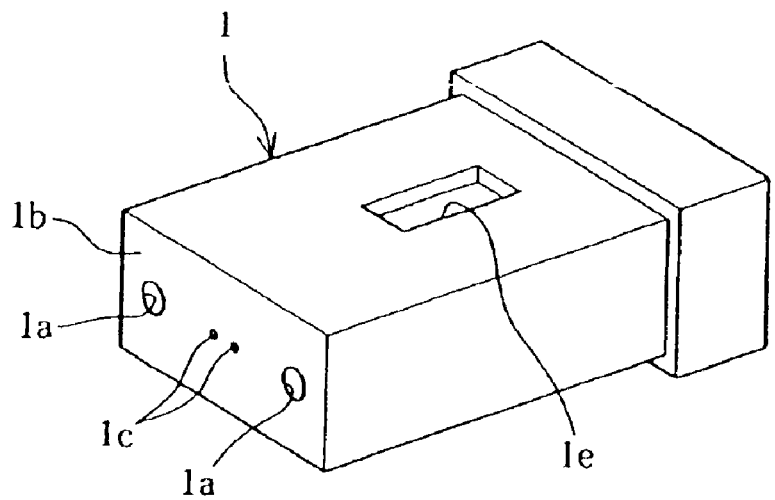
FIG. 8 shows a perspective view of a conventional ferrule.
Figure 9:
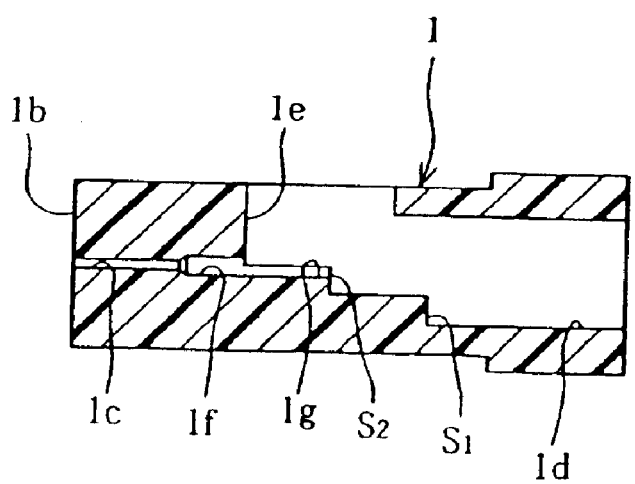
FIG. 9 shows a longitudinal sectional view of the ferrule of FIG. 8.

Also, a ferrule in accordance with the present invention, like a ferrule 14 shown in FIG. 7, may be provided with two alignment pin holes 14a for inserting alignment pins, and two independent fiber fixed holes H which are formed at a predetermined interval between the two alignment pin holes 14a. One end of fiber fixed hole H is open to a ferrule end face 14b, the other end thereof is open to the rear end face of ferrule. An optical fiber is inserted into and fixed to the fiber fixed hole H with an adhesive agent.

Each of the fiber fixed hole H has a fiber hole 14c, a fiber guide hole 14d, and a fiber insertion hole 14e, these holes having the same hole center. The fiber guide hole 14d is formed so that the diameter thereof decreases gradually from the side of the fiber insertion hole 14e toward the fiber hole 14c.

Therefore, it is preferable that the ferrule 14, like the ferrule 12, be provided with a tapered portion between the fiber hole 14c and the fiber guide hole 14d, and the diameter of the fiber hole 14c, the diameter of the fiber insertion hole 14e, the length of the fiber hole 14c, and the diameter and length of the fiber guide hole 14d satisfy the same relational equation as that of the fiber fixed hole H of the first embodiment. Thereby, a when the ferrule 14 is assembled into a multi-connector by the inserting optical ribbon fiber into the fiber fixed holes H, in addition to the effects of the ferrule 10, the optical ribbon fiber can be inserted more easily as compared with the ferrule 10, and the assembling efficiency is further increased. At this time, the diameter of the fiber guide hole 14d is an average diameter of (Df+Din)/2 (mm).

As described above, the tip end of an optical fiber is inserted from the fiber insertion hole into the fiber guide hole along the tapered portion without being resisted, so that the efficiency of work for inserting the fiber is increased, and also the breakage of the optical fiber is prevented.

Also, variations in connection loss caused by the temperature variations in the application environment of the ferrule are prevented.

Also, said fiber insertion hole is formed separately, so that each fiber can be inserted surely into a predetermined fiber insertion hole. Also, the aligning operation at the time of optical fiber insertion is excellent.

For the ferrule shown in FIG. 2A of the present invention, movement regulating means is formed in the fiber insertion hole, so that an optical fiber can be inserted surely into a predetermined fiber insertion hole.

For the ferrule shown in FIG. 2b of the present invention, the adhesive agent pool for fixing an optical fiber is formed at the opening portion of the fiber insertion hole, so that an adhesive agent can be poured easily. Also, even if the adhesive agent flows reversely in the fiber fixed hole at the time of optical fiber insertion, the adhesive agent does not flow out of the ferrule along the optical fiber.

For the ferrule shown in FIG. 2b of the present invention, the width of the opening of the adhesive agent pool in the direction perpendicular to the direction of arrangement of sheathed portion is larger than the width of the opening thereof in the direction of arrangement of sheathed portion, so that an adhesive agent pool as large as possible can be formed between the alignment pin holes at a limited interval while the thickness between the alignment pinhole and the adhesive agent pool is maintained sufficiently in terms of strength.

For the ferrule shown in FIG. 2b of the present invention, the fiber guide hole and the fiber insertion hole are formed into a continuous taper shape, so that the tip end of an optical fiber is inserted from the fiber insertion hole into the fiber guide hole along the tapered portion without being resisted. Therefore, the efficiency of work for inserting the fiber is increased, and also the breakage of the optical fiber is prevented. Also, variations in connection loss caused by the temperature variations in the application environment of the ferrule are prevented.

What is claimed is:

1. A ferrule having a transverse axis and comprising:

at least two alignment pin holes into which alignment pins for positioning mating ferrule are inserted; and a plurality of fiber fixed holes for inserting an optical fiber, said fiber fixed holes being formed at predetermined locations along said transverse axis with respect to said two alignment pin holes, each of said fiber fixed holes having at least a fiber guide portion for guiding the optical fiber, a fiber hole portion adjacent said fiber guide portion to receive the tip end of the optical fiber, and a fiber insertion portion adjacent said fiber guide portion, said fiber insertion portion being formed as a common fiber insertion portion to receive sheathed portions a plurality of optical fibers;

wherein said fiber guide portion and said fiber insertion portion are joined with a connecting portion having a tapered shape; and wherein said fiber insertion portion has a convex portion for regulating the movement of said sheathed portions of the optical fibers along said transverse axis, and the width of said fiber insertion portion at the convex portion in the direction perpendicular to said transverse axis is smaller than the diameter of said sheathed portion.

2. A ferrule having a transverse axis and comprising:

at least two alignment pin holes into which alignment pins for positioning with respect to a mating ferrule are inserted; and a plurality of fiber fixed holes for inserting an optical fiber, said fiber fixed holes being formed at predetermined locations along said tansverse axis with respect to said two alignment pin holes;

wherein each of said fiber fixed holes has at least a fiber guide portion for guiding the optical fiber, a fiber hole portion adjacent said fiber guide portion to receive the tip end of the optical fiber, a fiber insertion portion adjacent said fiber guide portion to receive the sheathed portion of the optical fiber, and an adhesive agent pool for receiving adhesive for fixing the optical fiber formed at the opening portion of said fiber insertion portion; and wherein said fiber guide portion and said fiber insertion portion are joined with a connecting portion having a tapered shape; and wherein the width of the opening portion of said adhesive agent pool in the direction perpendicular to said transverse axis is larger than the width of said opening portion in the direction of said transverse axis.

3. The ferrule according to claim 2, wherein said fiber guide portion and said fiber insertion portion are formed into a continuous taper shape.

4. A ferrule comprising:

at least two alignment pin holes into which alignment pins for positioning a mating ferrule are inserted; and a plurality of fiber fixed holes for inserting an optical fiber, said fiber fixed holes being formed at predetermined locations along said transverse axis with respect to said two alignment pin holes;

wherein each of said fiber fixed holes has at least a fiber guide portion for guiding the optical fiber, a fiber hole portion adjacent said fiber guide portion to receive the tip end of the optical fiber, a fiber insertion portion adjacent said fiber guide portion to receive the sheathed portion of the optical fiber, and an adhesive agent pool for receiving adhesive for fixing the optical fiber formed at the opening portion of said fiber insertion portion, said fiber guide portion and said fiber insertion portion being joined with a connecting portion having a tapered shape, said fiber insertion portion having a convex portion for regulating the movement of a sheathed portion of the optical fiber in the direction of said transverse axis; and wherein the width of the opening portion of said adhesive agent pool in the direction perpendicular to the direction of said transverse axis is larger than the width of said opening portion in the direction of said transverse axis.

* * * * *